United States Patent
Thompson

[19]

[11] Patent Number: 6,053,674
[45] Date of Patent: Apr. 25, 2000

[54] DUST COLLECTOR ASSEMBLY FOR DRILLING TOOLS

[76] Inventor: John Eugene Thompson, 811 Chestnut Ave., Bowie, Md. 20715

[21] Appl. No.: 09/262,082

[22] Filed: Mar. 4, 1999

[51] Int. Cl.[7] .................................................... B23B 47/34
[52] U.S. Cl. ............................................. 408/67; 175/209
[58] Field of Search ................................ 175/209; 408/67

[56] References Cited

U.S. PATENT DOCUMENTS

| | | |
|---|---|---|
| 3,848,686 | 11/1974 | Jysky et al. . |
| 4,205,728 | 6/1980 | Gloor et al. . |
| 5,090,499 | 2/1992 | Cuneo ...................................... 175/209 |
| 5,129,467 | 7/1992 | Watanabe et al. ........................ 408/67 |
| 5,605,421 | 2/1997 | Hodgson . |
| 5,660,240 | 8/1997 | Harms et al. ............................ 175/209 |
| 5,983,445 | 11/1999 | Baker ........................................ 408/67 |

Primary Examiner—Daniel W. Howell
Attorney, Agent, or Firm—Larson & Taylor

[57] ABSTRACT

A dust collector assembly is provided for use with a hand-held drilling device, or drilling holes in a ceiling to prevent the dust and other debris from falling onto the user of the drilling device. The assembly includes a rounded oblong body shell defining a chamber open on one side. The shell wall has an edge extending therealong, on the one side, that is placed against the ceiling into which holes are to be drilled. The body shell includes a drill hole therein that enables the drilling device to be inserted therethrough into the chamber. A hose connector, received in an opening at the opposite end of the body shell, is adapted to be connected to a suction hose. One of a plurality of drill hole adaptors is received in the drill hole in the body shell. The adaptors have central apertures of different diameters. Thus, drilling elements of different effective outer diameters can be used with the assembly while substantially maintaining a desired spacing between the drilling element and the adaptor by selecting and using an adaptor having a diameter correspondingly matched to the effective diameter of the drill element.

11 Claims, 2 Drawing Sheets

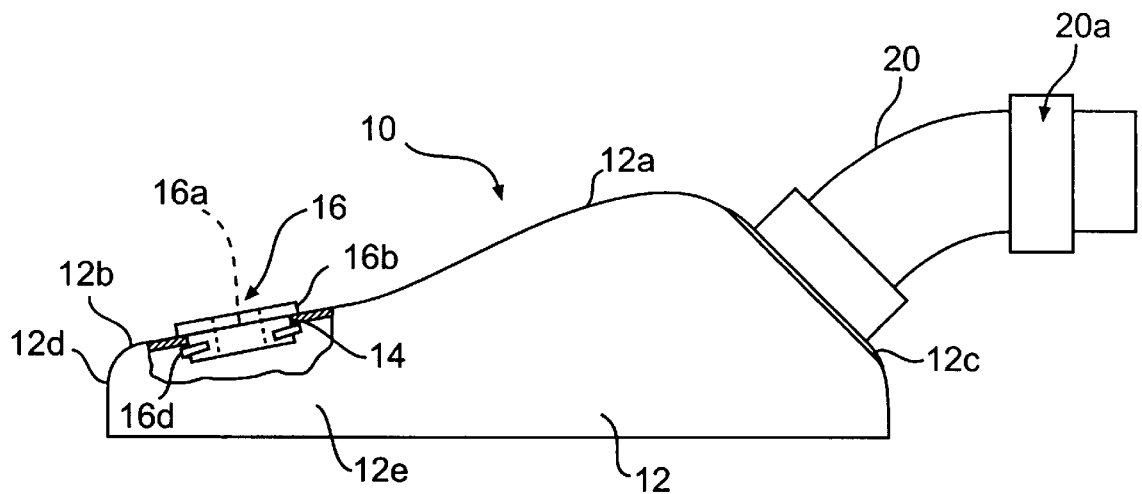
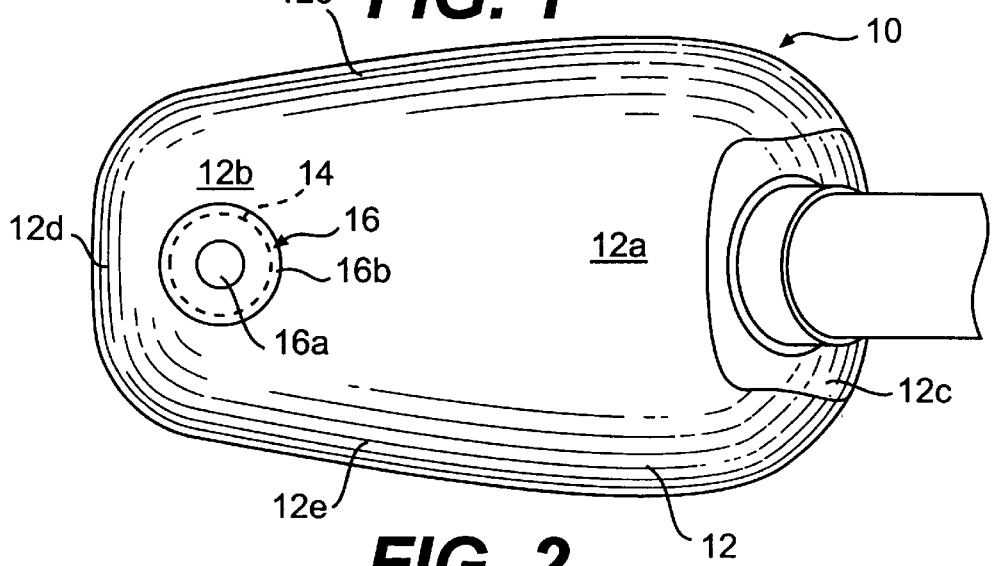
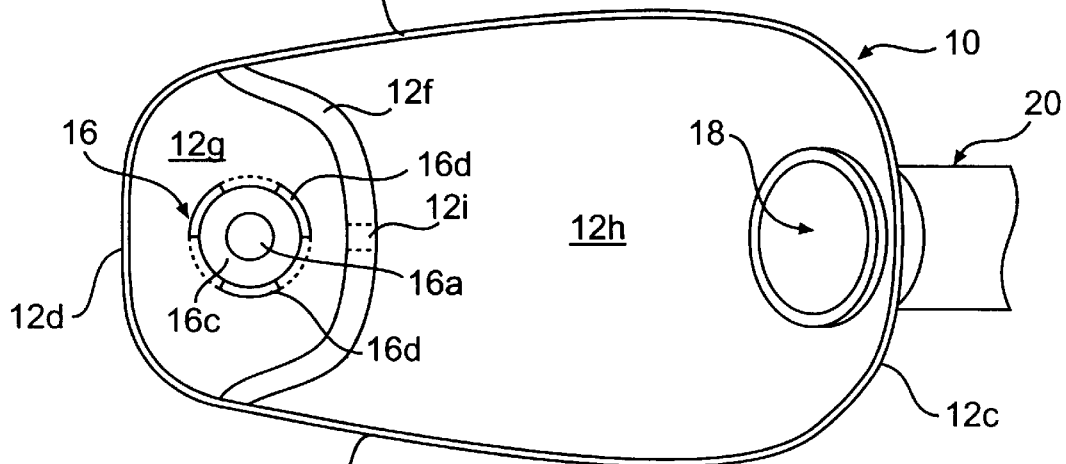

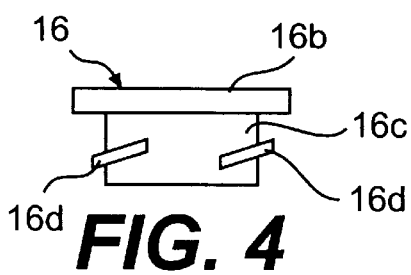
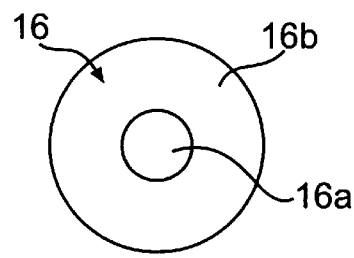
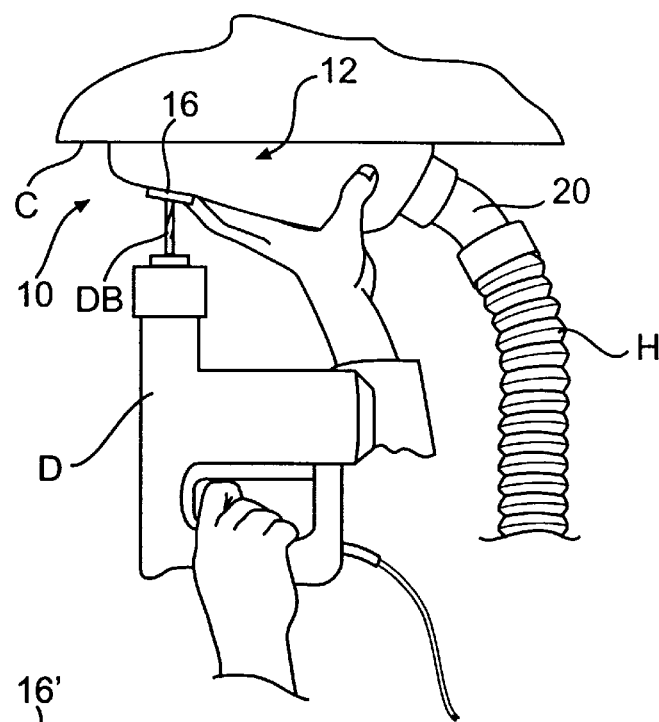
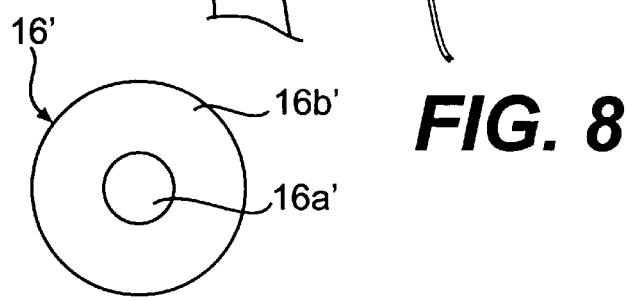
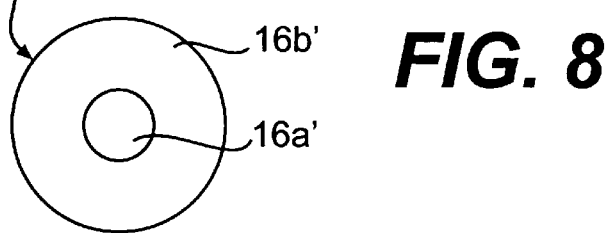
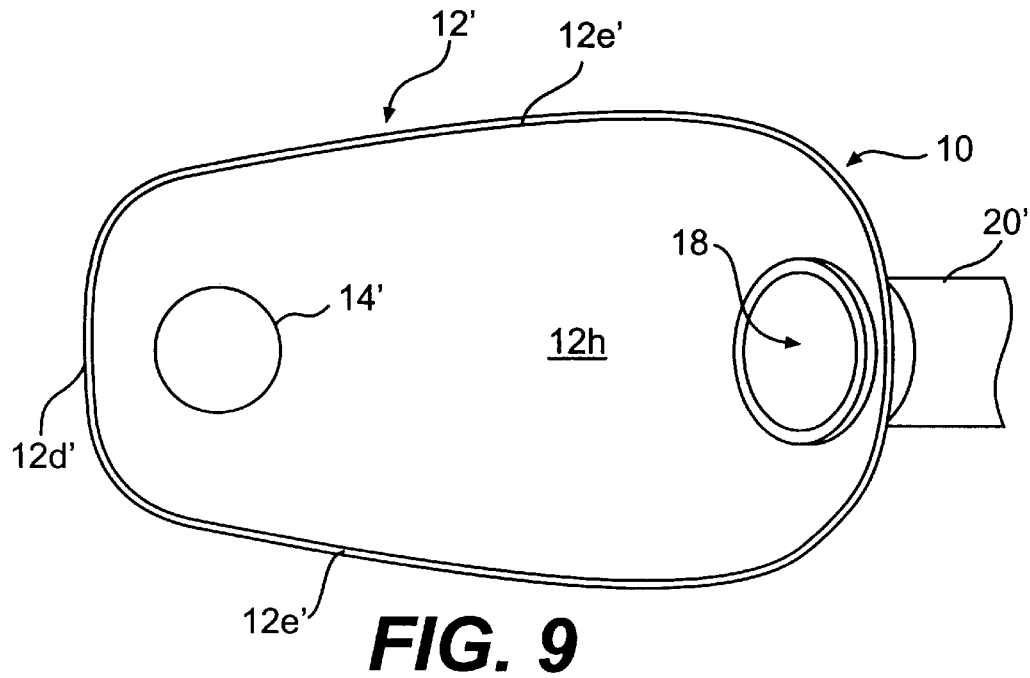

DUST COLLECTOR ASSEMBLY FOR DRILLING TOOLS

FIELD OF THE INVENTION

The present invention relates to devices designed for home building or shop use in collecting dust produced by a drilling tool such as a hand drill produced, e.g., when drilling into a ceiling or other overhead surface.

BACKGROUND OF THE INVENTION

A number of devices have been developed for collecting dust during drilling. Some of these devices are of a heavy duty construction such as those used in rock drilling while others are designed for use with hand tools and power tools such as handheld drills in connection with home building or remodeling (e.g., in drilling holes in a ceiling). While cost consideration in connection with the former are of lesser importance, there is a premium on simplicity and low cost for dust collectors designed for use in home construction, shops and the like.

U.S. Pat. No. 5,605,421 (Hodgson) discloses a dust collector or extractor which is designed for use with a power drill and which includes a housing divided into two compartments. One compartment includes an access opening reinforced with a steel washer through which the drill bit extends. The two compartments are sealed from one another and a tube extends from a connecting opening to a suction outlet. The tube includes a valve which, when operated, enables air flow to the suction outlet so that waste material can be drawn from the working site while suction is released.

U.S. Pat. No. 3,488,686 (Jysky et al) discloses a hood for collecting drill dust, especially in rock drilling, which is adapted to rest with the lower edge surface thereof against the rock surface. Inner and outer shells are arranged to hold therebetween an elastic sealing member having an aperture therein which fits around a drill bit and aligns with corresponding apertures in the shells. The patent also describes prior art hoods made of a stiff material wherein a detachable sealing member is used to seal the narrow drill gland. Changing of the sealing members is described as a relatively complicated process requiring tools.

U.S. Pat. No. 4,205,728 (Gloor et al) discloses a vacuum device for use with a power drill including a muzzle part having an opening through which a drill bit extends. The muzzle part includes a suction aperture communicating with the drill bit opening at one side thereof and a suction tube or hose connected to the suction aperture.

SUMMARY OF THE INVENTION

According to the invention, a dust collector assembly is provided which is simple and inexpensive yet rugged in construction and which is adapted to be used effectively and efficiently with a variety of hand-held tools of different characteristics including bits or drill elements of different effective diameters.

In accordance with a first aspect of the invention, a dust collector assembly is provided for use with a hand-held drilling device having a drilling element, the assembly comprising: a body member defining a chamber open on one side and including a body wall having an edge extending therealong, on said one side, adapted to be placed against a surface into which holes are to be drilled, said body member including a drill hole therein at one end thereof in communication with said chamber so as to enable a drilling element of a drilling device to be inserted through said hole into said chamber, and a suction connection opening at an opposite end therein, said assembly further comprising a hose connector received in the suction connection opening and adapted to be connected to a suction source and a plurality of drill hole adaptors adapted to be received in said drill hole in the body member and having central apertures of different diameters, whereby drilling elements of different effective outer diameters can be used with the assembly while substantially maintaining a desired spacing between the drilling element and the adaptor by using an adaptor having a diameter correspondingly matched to the effective diameter of the drill element.

Preferably, the body member includes an internal wall disposed adjacent to the drill hole and defining, in cooperation with a portion of the body wall, a further chamber surrounding the drill hole.

Advantageously, each of said adaptors includes means for enabling the adaptor to be snap-fit into the drill hole. In a preferred implementation, the adaptors each include a depending skirt, and said means comprises at least one raised retaining element on the skirt.

The body member preferably comprises a rounded oblong shell. Advantageously, the shell includes a first, rounded, substantially vertical end wall, rounded, substantially vertical side walls and a second, inclined end wall including said suction connection opening.

In accordance with a further aspect of the invention, a dust collector assembly is provided for us with a hand-held drilling device having a drilling element, the dust collector assembly comprising: a rounded oblong body shell defining a chamber open on one side and including a shell wall having an edge extending therealong on said one side adapted to be placed against a ceiling into which holes are to be drilled, said body shell including a drill hole therein at one end thereof in communication with said chamber so as to enable a drilling element of a drilling device to be inserted through said hole into said chamber, and an opening at an opposite end therein, said assembly further comprising a hose connector received in said opening and adapted to be connected to a suction hose and a set of drill hole adaptors adapted to be received as a removable snap-fit in said drill hole in said body shell and having central apertures of different diameters whereby drilling elements of different effective outer diameters can be used with the dust collector assembly while substantially maintaining a desired spacing between the drilling element and the adaptor by using an adaptor having a diameter correspondingly matched to the effective diameter of the drill element.

Preferably, the body shell includes an internal wall disposed adjacent to the drill hole and defining, in cooperation with a portion of the shell wall, a further chamber surrounding the drill hole for, in use, creating a confined turbulence around the drill hole.

Each of said adaptors preferably includes means thereon for enabling the adaptor to be snap-fit into the drill hole. Advantageously, the adaptors each include a depending skirt and said means comprises at least one raised retaining element on said skirt.

According to yet another aspect of the invention, a dust collector device is provided for use with a hand-held drilling device having a drilling element, the dust collector device comprising: a rounded oblong body shell defining a chamber open on one side and including a shell wall having an edge extending therealong on said one side adapted to be placed against a ceiling into which holes are to be drilled, said body shell including a drill hole therein at one end thereof in communication with said chamber so as to enable a drilling element of a drilling device to be inserted through the hole into the chamber, and an opening at an opposite end therein, said device further comprising a hose connector received in the opening and adapted to be connected to a suction hose, and the body shell further including an internal wall disposed adjacent to the drill hole and, in cooperation with the shell wall, dividing said chamber into first and second chambers, the first chamber surrounding the drill hole and, in the operation of the device, creating a confined turbulence around the drill hole, and the second chamber being in communication with the hose connector, the internal wall including a connecting aperture therein providing a passage between the first and second chambers so that suction is communicated to the first chamber.

Further features and advantages of the present invention will be set forth in, or apparent from, the detailed description of preferred embodiments thereof which follows.

BRIEF DESCRIPTION OF THE DRAWINGS

FIG. 1 is a side elevational view of a dust collector device in accordance with a first preferred embodiment of the invention;

FIG. 2 is a top plan view of the device of FIG. 1;

FIG. 3 is a bottom plan view of the device of FIG. 1;

FIGS. 4, 5, and 6 are a side elevational view, a top plan view and a bottom plan view, respectively, an adaptor of the type which is shown in FIGS. 1 to 3 and which is constructed in accordance with a preferred embodiment of the invention;

FIG. 7 is a top plan view of further adaptor, showing the different size drill aperture provided thereby;

FIG. 8 is a schematic representation of the device of the invention in use; and

FIG. 9 is a bottom plan view of a further preferred embodiment of the invention illustrating the differences between this embodiment of that of FIGS. 1 to 3.

DESCRIPTION OF THE PREFERRED EMBODIMENTS

Referring to FIGS. 1 to 3, a first, preferred embodiment of the dust collector of the invention is shown. The dust collector, which is generally denoted 10, includes a rounded oblong shaped body member or shell 12 with an open bottom. Shell 12 comprises, as viewed in FIG. 1, a generally flat, sloping upper surface 12a which terminates in a flattened, generally horizontally extending distal upper surface 12b, as well as a more severely sloping proximal end surface 12c, a rounded, generally vertically extending, distal end surface 12d, and similarly shaped side surfaces 12e. As shown in FIG. 2 and, more particularly in FIG. 3, the overall shape of the body member 12 is roughly elliptical with the distal end tapered down from the proximal end.

In the embodiment of FIGS. 1 to 3, body member 12 includes an inner, generally semi-circular wall 12f which divides the interior of body member into two chambers 12g and 12h (see FIG. 3) that are connected together by a connecting passage or throughhole 12i formed centrally in wall 12f.

Body member 12 is preferably made of a non-breakable, friction-resistant, i.e., abrasive-resistant, material so the member 12 does not wear down when applied against a relatively rough surface such as a concrete or rough plaster ceiling. A rigid, rubberized compound is suitable for this purpose. When the body member 12 is so constructed, no sealing strip around the lower edges is necessary.

An aperture 14 is provided in the wall of body member 12, centrally of distal upper surface 12b, which is adapted to permit passage of a drill bit or other drilling element therethrough. As illustrated, aperture 14 receives an adaptor 16 having a central opening 16a therein adapted for use with the particular drill and drill bit to be employed. As best seen in FIGS. 4 to 6, adaptor 16 includes an upper circular flange 16b which bears against the portion of surface 12b surrounding aperture 14, and a depending portion 16c which is sized to fit tightly within aperture 14 and which, in the illustrated embodiment, includes raised locking elements 16d on the outer surface thereof for securing adaptor 16 in place in aperture 14. Thus, adaptor 16 is essentially a snap-fit within aperture 14 but is designed to be removed and replaced relatively easily because of the limited resilience of depending portion 14 and locking elements 12c. Adaptor 16 is preferably made of the same material that is used for making body member 12, i.e., a relatively rigid rubber-like material but suitable hard plastics can be used as well. Adaptor 16 can be of a different construction from that shown in FIGS. 4 to 6 but, as discussed above, the adaptor should be relatively easy to insert into aperture 14 and relatively easy to be "popped out" or otherwise removed therefrom.

In accordance with the present invention, a series of adaptors are provided having different openings therein corresponding to opening 16a. A second adaptor, denoted 16', is shown in FIG. 7. As is indicated in FIG. 7, adaptor 16 has an opening 16a' smaller than opening 16a of adaptor 16 in FIGS. 4 to 6. It will be understood that adaptor 16' is otherwise similar to adaptor 16 and that further adaptors with other different sized openings can also be provided.

A connector aperture 18 is provided in body member 12, at the proximal end thereof. Aperture 18 receives a hose connector 20 which is adapted to be connected to a vacuum source such as that provided by a shop vacuum device or an ordinary vacuum cleaner. In the illustrated embodiment, a hose connector element 20a is provided at the distal end of connector 20.

In operation, the dust collector device 10 is used in the general manner shown in FIG. 8. After the body member 12 is first placed over the drill bit DB of a drill, indicated at D, so that the drillbit DB extends through the opening 16a in adaptor 16, the drillbit DB is placed on the location to be drilled. The body member 12 is then slid up the drillbit DB so as to locate the body member 12 against the surface to be drilled as shown in FIG. 8. The suction created within body member 12 holds the body member against the ceiling thereby leaving both hands free to operate the drill D. The vacuum or suction force is created through a vacuum hose H connected to connector 18, and dust and debris created when the hole is drilled is captured in body member 12 and suctioned away through hose H.

The provision of the chamber 12g which surrounds the drill bit creates a localized turbulence and suction action in the area of the drill bit that is useful in holding the dust and other debris, particularly in applications wherein a relatively small vacuum force is exerted. However, in other applications chamber 12g is essentially not required so that in an alternative embodiment, the body member 12 has a smooth inner surface as shown in FIG. 9. FIG. 9 is otherwise similar to FIG. 3, apart from the adaptor being removed from drill aperture 14', and corresponding elements have been given the same reference number with a prime attached.

It is important to note that the body member 12 will fall off or otherwise separate from the ceiling if the size of the opening around the drill is not optimized, and this function is performed by using the appropriate adaptor, e.g., one of the adaptors indicated at 16 and 16'. For example, the suction from a conventional six HP vacuum cleaner with a standard two inch hose is required to suspend a 10 foot length of the hose, i.e., suction less than this amount will not provide this suspension unless a properly sized adaptor, corresponding, e.g., to adaptor 16 or 16', is used. A number of factors such as the amount of suction created, the length of hose to be suspended, the size and shape of the drill and drill bit (e.g., the size of the bit flutes) determine the proper size of the opening provided around the drill. If the opening provided by the adaptor is too big, the appropriate amount of suction for suspending the dust collector device 10 will not be created or in an extreme case, the dust and other debris will not be captured by the drill. On the other hand, the opening provided should not be too small either because this can lead to a situation wherein the device 10 is essentially sealed to the ceiling by the vacuum forces and cannot be readily moved. The adaptors of the invention enable the spacing to be optimized based on the particular parameters associated with a specific application.

Although the invention has been described above in relation to preferred embodiments thereof, it will be understood by those skilled in the art that variations and modifications can be effected in these preferred embodiments without departing from the scope and spirit of the invention.

What is claimed is:

1. A dust collector assembly for use with a hand-held drilling device having a drilling element, said assembly comprising:

a body member defining a chamber open on one side and including a body wall having an edge extending therealong, on said one side, adapted to be placed against a surface into which holes are to be drilled, said body member including a drill hole therein at one end thereof in communication with said chamber so as to enable a drilling element of a drilling device to be inserted through said hole into said chamber, and a suction connection opening at an opposite end therein, said assembly further comprising a hose connector received in said suction connection opening and adapted to be connected to a suction source and a plurality of drill hole adaptors adapted to be received in said drill hole in said body member and having central apertures of different diameters, whereby drilling elements of different effective outer diameters can be used with the assembly while substantially maintaining a desired spacing between the drilling element and the adaptor by using an adaptor having a diameter correspondingly matched to the effective diameter of the drill element.

2. A dust collector assembly according to claim 1 wherein said body member includes an internal wall disposed adjacent to said drill hole and defining, in cooperation with a portion of the body wall, a further chamber surrounding said drill hole.

3. A dust collector assembly according to claim 1 wherein each of said adaptors includes means for enabling the adaptor to be snap-fit into said drill hole.

4. A dust collector assembly according to claim 3 wherein said adaptors each include a depending skirt and said means comprises at least one raised retaining element on said skirt.

5. A dust collector assembly according to claim 1 wherein said body member comprises a rounded oblong shell.

6. A dust collector assembly according to claim 5 wherein said shell includes a first rounded, substantially vertical end wall, rounded, substantially vertical side walls and a second, inclined end wall including said suction connection opening.

7. A dust collector assembly for use with a hand-held drilling device having a drilling element, said dust collector assembly comprising:

a rounded oblong body shell defining a chamber open on one side and including a shell wall having an edge extending therealong on said one side adapted to be placed against a ceiling into which holes are to be drilled, said body shell including a drill hole therein at one end thereof in communication with said chamber so as to enable a drilling element of a drilling device to be inserted through said hole into said chamber, and an opening at an opposite end therein, said assembly further comprising a hose connector received in said opening and adapted to be connected to a suction hose and a set of drill hole adaptors adapted to be received as a removable snap-fit in said drill hole in said body shell and having central apertures of different diameters whereby drilling elements of different effective outer diameters can be used with the dust collector assembly while substantially maintaining a desired spacing between the drilling element and the adaptor by using an adaptor having a diameter correspondingly matched to the effective diameter of the drill element.

8. A dust collector assembly according to claim 7 wherein said body shell includes an internal wall disposed adjacent to said drill hole and defining, in cooperation with a portion of the shell wall, a further chamber surrounding said drill hole for creating a confined turbulence around said drill hole.

9. A dust collector assembly according to claim 7 wherein each of said adaptors includes means thereon for enabling the adaptor to be snap-fit into said drill hole.

10. A dust collector assembly according to claim 9 wherein said adaptors each include a depending skirt and said means comprises at least one raised retaining element on said skirt.

11. A dust device assembly for use with a hand-held drilling device having a drilling element, said dust collector device comprising:

a rounded oblong body shell defining a chamber open on one side and including a shell wall having an edge extending therealong on said one side adapted to be placed against a ceiling into which holes are to be drilled, said body shell including a drill hole therein at one end thereof in communication with said chamber so as to enable a drilling element of a drilling device to be inserted through said hole into said chamber, and an opening at an opposite end therein, said assembly further comprising a hose connector received in said opening and adapted to be connected to a suction hose, said body shell further including an internal wall disposed adjacent to said drill hole, for dividing said chamber into first and second chambers, said first chamber surrounding said drill hole and, in operation, creating a confined turbulence around said drill hole, and said second chamber being in communication with said hose connector, said internal wall including a connecting aperture therein providing a passage between said first and second chambers so that suction is communicated to said first chamber.

* * * * *